US006657693B1

United States Patent
Jeong et al.

(10) Patent No.: US 6,657,693 B1
(45) Date of Patent: Dec. 2, 2003

(54) LIQUID CRYSTAL DISPLAY

(75) Inventors: Youn Hak Jeong, Kyoungki-do (KR); Hyang Yul Kim, Kyoungki-do (KR); Seung Hee Lee, Kyoungki-do (KR)

(73) Assignee: Boe-Hydis Technology Co., Ltd., Kyoungki-do (KR)

( * ) Notice: Subject to any disclaimer, the term of this patent is extended or adjusted under 35 U.S.C. 154(b) by 0 days.

(21) Appl. No.: 09/456,126

(22) Filed: Dec. 7, 1999

(30) Foreign Application Priority Data

Dec. 17, 1998 (KR) ........................................ 1998-55674

(51) Int. Cl.[7] ................................................ G02F 1/13
(52) U.S. Cl. ....................................................... 349/141
(58) Field of Search ......................................... 349/141

(56) References Cited

U.S. PATENT DOCUMENTS

| 5,223,960 A | 6/1993 | Kim | 359/54 |
|---|---|---|---|
| 5,303,074 A | 4/1994 | Salisbury | 359/59 |
| 5,381,252 A | 1/1995 | Chen | 359/48 |
| 5,574,593 A | 11/1996 | Wakita et al. | 359/259 |
| 5,666,179 A | 9/1997 | Koma | 349/143 |
| 5,745,206 A | 4/1998 | Koike et al. | 349/129 |
| 5,774,255 A | 6/1998 | Howard | 359/267 |
| 5,818,558 A | 10/1998 | Ogishima | 349/110 |
| 5,861,929 A | 1/1999 | Spitzer | 349/74 |
| 6,088,078 A | * 7/2000 | Kim et al. | 349/141 |
| 6,124,915 A | * 9/2000 | Kondo et al. | 349/141 |
| 6,144,434 A | * 11/2000 | Kim et al. | 349/130 |
| 6,342,938 B1 | * 1/2002 | Song et al. | 349/129 |

* cited by examiner

Primary Examiner—James Dudek
(74) Attorney, Agent, or Firm—Ladas & Parry

(57) ABSTRACT

Liquid crystal display having fast response time and preventing color shift is disclosed. The liquid crystal display comprises: a lower substrate having a plurality of gate bus lines disposed parallel to each other, a plurality of data bus lines disposed perpendicular to the gate bus lines and defining matrix type sub pixels together with the gate bus lines, a thin film transistor provided adjacent to an intersection of the gate bus line and the data bus line, and a pixel electrode connected to the thin film transistor and disposed within the sub pixel; an upper substrate opposed to the lower substrate with a selected distance and having a counter electrode, the counter electrode formed at a portion corresponding to the sub pixel and forming an electric field together with the pixel electrode; a liquid crystal layer sandwiched between and having a plurality of liquid crystal molecules; a first homeotropic alignment layer and a second homeotropic alignment layer formed at inner face of the lower substrate and at inner face of the upper substrate respectively; and a first polarizing plate and a second polarizing plate attached at outer face of the lower substrate and at outer face of the upper substrate respectively, wherein the electric field formed between the counter electrode and the pixel electrode is formed as an oblique line with respect to the lower substrate surface, and is formed as a diagonal line having a symmetry with respect to the data bus line and the gate bus line.

20 Claims, 4 Drawing Sheets

LIQUID CRYSTAL DISPLAY

FIELD OF THE INVENTION

The present invention generally relates to a liquid crystal display, and more particularly to a liquid crystal display capable of preventing color shift and having enhanced response time.

BACKGROUND OF THE INVENTION

A liquid crystal display device has been used in various information display terminals. The major operating system for the liquid crystal display device is the twisted nematic ("TN") and the super twisted nematic ("STN"). Though they are presently commercially used in the market, the problems of narrow viewing angle are still remained unsolved.

An In-Plane Switching ("IPS") mode liquid crystal display has been suggested to solve foregoing problems.

As described in FIG. 1, a plurality of gate bus lines 11 are formed on a lower insulating substrate 10 along an x direction shown in the drawings and the gate bus lines 11 are parallel to each other. A plurality of data bus lines 15 are formed along a y direction which is substantially perpendicular to the x direction.

At this time, a pair of gate bus lines 11 and a pair of data bus lines 15 are formed for defining the sub-pixel region. The gate bus line 11 and the data bus line 15 are insulated by a gate insulating layer(not shown).

A counter electrode 12 is formed, for example in a rectangular frame shape, within a sub-pixel region and it is disposed at the same plane with the gate bus line 11.

A pixel electrode 14 is formed at each sub-pixel region where the counter electrode 12 is formed. The pixel electrode 14 is composed of a web region 14a which divides the region surrounded by the rectangular frame type counter electrode 12 with a y direction, a first flange region 14b connected to a portion of the web region 14a and simultaneously overlapped with the counter electrode 12 of the x direction, and a second flange region 14c which is parallel to the first flange region 14b and is connected to the other portion of the web region 14a. That is to say, the pixel electrode 14 seems to be the letter "I". Herein, the counter electrode 12 and the pixel electrode 14 are made of opaque metal layers.

The pixel electrode 14 and the counter electrode 12 are insulated from each other by a gate insulating layer (not shown).

A thin film transistor 16 ("TFT") is disposed at the intersection of the gate bus line 11 and the data bus line 15. This TFT 16 is composed of a gate electrode being extended from the gate bus line 11, a drain electrode being extended from the data bus line 15, a source electrode being extended from the pixel electrode 14 and a channel layer 17 formed on upper of the gate electrode.

A storage capacitor Cst is disposed at the region where the counter electrode 12 and the pixel electrode 14 are overlapped.

Although not shown in FIG. 1, an upper substrate(not shown) equipped with a color filter(not shown) is disposed with a predetermined distance opposite to a lower substrate 10. Herein, the distance between the upper substrate and the lower substrate 10 is smaller than that between a region of the counter electrode toward the y direction and the web region of the pixel electrode thereby forming a parallel field which is parallel with the substrate surface. Further a liquid crystal layer(not shown) having a plurality of liquid crystal molecules is interposed between the upper substrate (not shown) and the lower substrate 10.

Also, onto the resultant structure of the lower substrate and onto an inner surface of the upper substrate are formed homogeneous alignment layers respectively. By the homogeneous alignment layer, before forming an electric field between the counter electrode 12 and the pixel electrode 14, long axes of liquid crystal molecules 19 are arranged parallel to the surface of the substrate 10. Also, by the rubbing axis of the homogeneous alignment layer, the orientation direction of the molecules 19 is decided. The R direction in the drawings is the direction of rubbing axis for the homogeneous alignment layer formed on the lower substrate 10.

A first polarizing plate(not shown) is formed on the outer surface of the lower substrate 10 and a second polarizing plate(not shown) is formed on the outer surface of the upper substrate(not shown). Herein, the first polarizing plate is disposed to make its polarizing axis to be parallel to the P direction of the FIG. 1. That means, the rubbing axis direction R and the polarizing axis direction P are parallel each other. On the other hand, the polarizing axis of the second polarizing plate is substantially perpendicular to that of the first polarizing plate.

When a scanning signal is applied to the gate bus line 11 and a display signal is applied to the data bus line 15, the TFT 16 disposed at the intersection of the gate bus line 11 and the data bus line 15 is turned on. Then the display signal of the data bus line 15 is transmitted to the pixel electrode 14 through the TFT 16. Consequently, an electric field E is generated between the counter electrode 12 where a common signal is inputted and the pixel electrode 14. At this time, the direction of electric field E is referenced as to x direction as described in the FIG. 1, it has a selected degree of angle with the rubbing axis.

Afterwards, before the electric field is not generated, the long axes of the liquid crystal molecules are arranged parallel to the substrate surface and parallel to the rubbing direction R. Therefore the light passed through the first polarizing plate and the liquid crystal layer is unable to pass the second polarizing plate, the screen has dark state.

When the electric field is generated, the long axes(or optical axes) are rearranged parallel to the electric field, and therefore the incident light passed through the first polarizing plate and the liquid crystal layer passes the second polarizing plate and the screen has white state.

At that time, the direction of the long axes of the liquid crystal molecules changes according to the presence of the electric field, and the liquid crystal molecules are arranged parallel to the substrate surface. Accordingly, a viewer can see the long axes of liquid crystal molecules at all points in the screen, and the viewing angle characteristic is improved.

However, the IPS mode liquid crystal display as described above also includes following problems.

As well known, the refractive anisotropy(or birefringence, $\Delta$n) is occurred due to the difference in the lengths of the long and the short axes of the liquid crystal molecules. The refractive anisotropy $\Delta$n is also varied from the viewer's viewing directions. Therefore a predetermined color is appeared on the region where the polar angle is of 0 degree and the azimuth angle range of degrees 0, 90, 180 and 270 in spite of the white state. This regards as color shift and more detailed description thereof is attached with reference to the equation 1.

$$T \approx T_0 \sin^2(2\chi) \cdot \sin^2(\pi \cdot \Delta nd/\lambda) \quad \text{equation 1}$$

wherein,

T: transmittance;

$T_o$: transmittance to the reference light;

χ: angle between an optical axis of liquid crystal molecule and a polarizing axis of the polarizing plate;

⊿: birefringence;

d: distance or gap between the upper and lower substrates (thickness of the liquid crystal layer); and λ: wavelength of the incident light.

So as to obtain the maximum transmittance T, the χ should be π/4 or the ⊿nd/λ should be π/2 according to the equation 1. As the ⊿nd varies with the birefringence difference of the liquid crystal molecules depending on viewing directions, the value of λ is varied in order to make ⊿nd/λ to be π/2. According to this condition, the color corresponding to the varied wavelength λ appears.

Accordingly, as the value of ⊿n relatively decreases at the viewing directions "a" and "c" toward the short axes of the liquid crystal molecules, the wavelength of the incident light for obtaining the maximum transmittance relatively decreases. Consequently a blue color having shorter wavelength than a white color can be shown.

On the other hand, as the value of ⊿n relatively increases at the viewing directions "b" and "d" toward the short axes of the liquid crystal molecules, the wavelength of incident light relatively increases. Consequently a yellow color having a longer wavelength than the white color can be shown.

Furthermore, although the IPS-LCD is able to realize a wide viewing angle, response time thereof is very slow since long axes of the liquid crystal molecules are arranged and driven in parallel with the surface of the substrate, and no electrode is arranged at the upper substrate.

SUMMARY OF THE INVENTION

Accordingly, the object of the present invention is to provide a liquid crystal display preventing color shift generation and capable of improving display quality.

Further object of the present invention is to provide a liquid crystal display capable of improving response time characteristics.

To accomplish foregoing objects, the present invention provides a liquid crystal display comprising: a lower substrate having a plurality of gate bus lines disposed parallel to each other, a plurality of data bus lines disposed perpendicular to the gate bus lines and defining matrix type sub pixels together with the gate bus lines, a thin film transistor provided adjacent to an intersection of the gate bus line and the data bus line, and a pixel electrode connected to the thin film transistor and disposed within the sub pixel; an upper substrate opposed to the lower substrate with a selected distance and having a counter electrode, the counter electrode formed at a portion corresponding to the sub pixel and forming an electric field together with the pixel electrode; a liquid crystal layer sandwiched between and having a plurality of liquid crystal molecules; a first alignment layer and a second alignment layer formed at inner face of the lower substrate and at inner face of the upper substrate respectively; and a first polarizing plate and a second polarizing plate attached at outer face of the lower substrate and at outer face of the upper substrate respectively, wherein the electric field formed between the counter electrode and the pixel electrode is formed as an oblique line with respect to the lower substrate surface, and is formed as a diagonal line having a symmetry with respect to the data bus line and the gate bus line.

The present invention further provides a liquid crystal display comprising: a lower substrate having a plurality of gate bus lines disposed parallel to each other, a plurality of data bus lines disposed perpendicular to the gate bus lines and defining matrix type sub pixels together with the gate bus lines, a thin film transistor provided adjacent to an intersection of the gate bus line and the data bus line, and a pixel electrode connected to the thin film transistor and disposed within the sub pixel; an upper substrate opposed to the lower substrate with a selected distance and having a counter electrode, the counter electrode formed at a portion corresponding to the sub pixel and forming an electric field together with the pixel electrode; a liquid crystal layer sandwiched between and having a plurality of liquid crystal molecules; a first alignment layer and a second alignment layer formed at inner face of the lower substrate and at inner face of the upper substrate respectively; and a first polarizing plate and a second polarizing plate attached at outer face of the lower substrate and at outer face of the upper substrate respectively, wherein the counter electrode comprises a first electrode of a rectangular frame shape, and at least a second electrode disposed parallel with the gate bus line dividing a space surrounded by the first electrode into a plurality of square aperture regions; wherein the pixel electrode comprises a first branch parallel with the data bus lines and at least one or more second branches perpendicular to the first branch, and wherein an intersection of the first and the second branches is disposed at the right center of a space surrounded by the first and the second electrodes.

Furthermore, the present invention provides a liquid crystal display comprising: a lower substrate having a plurality of gate bus lines disposed parallel to each other, a plurality of data bus lines disposed perpendicular to the gate bus lines and defining matrix type sub pixels together with the gate bus lines, a thin film transistor provided adjacent to an intersection of the gate bus line and the data bus line, and a pixel electrode connected to the thin film transistor and disposed within the sub pixel; an upper substrate opposed to the lower substrate with a selected distance and having a counter electrode, the counter electrode formed at a portion corresponding to the sub pixel and forming an electric field together with the pixel electrode; a liquid crystal layer sandwiched between and having a plurality of liquid crystal molecules; a first homeotropic alignment layer and a second homeotropic alignment layer formed at inner face of the lower substrate and at inner face of the upper substrate respectively; a first polarizing plate and a second polarizing plate attached at outer face of the lower substrate and at outer face of the upper substrate respectively; and a phase compensation plate sandwiched between the second polarizing plate and the upper substrate, and having negative birefringence index, wherein the counter electrode comprises a first electrode of a rectangular frame shape, and at least a second electrode disposed parallel with the gate bus line dividing a space surrounded by the first electrode into a plurality of square aperture regions; wherein the pixel electrode comprises a first branch parallel with the data bus lines and at least one or more second branches perpendicular to the first branch, and wherein an intersection of the first and the second branches is disposed at the right center of a space surrounded by the first and the second electrodes.

DETAILED DESCRIPTION OF THE PREFERRED EMBODIMENT

Figure 1:
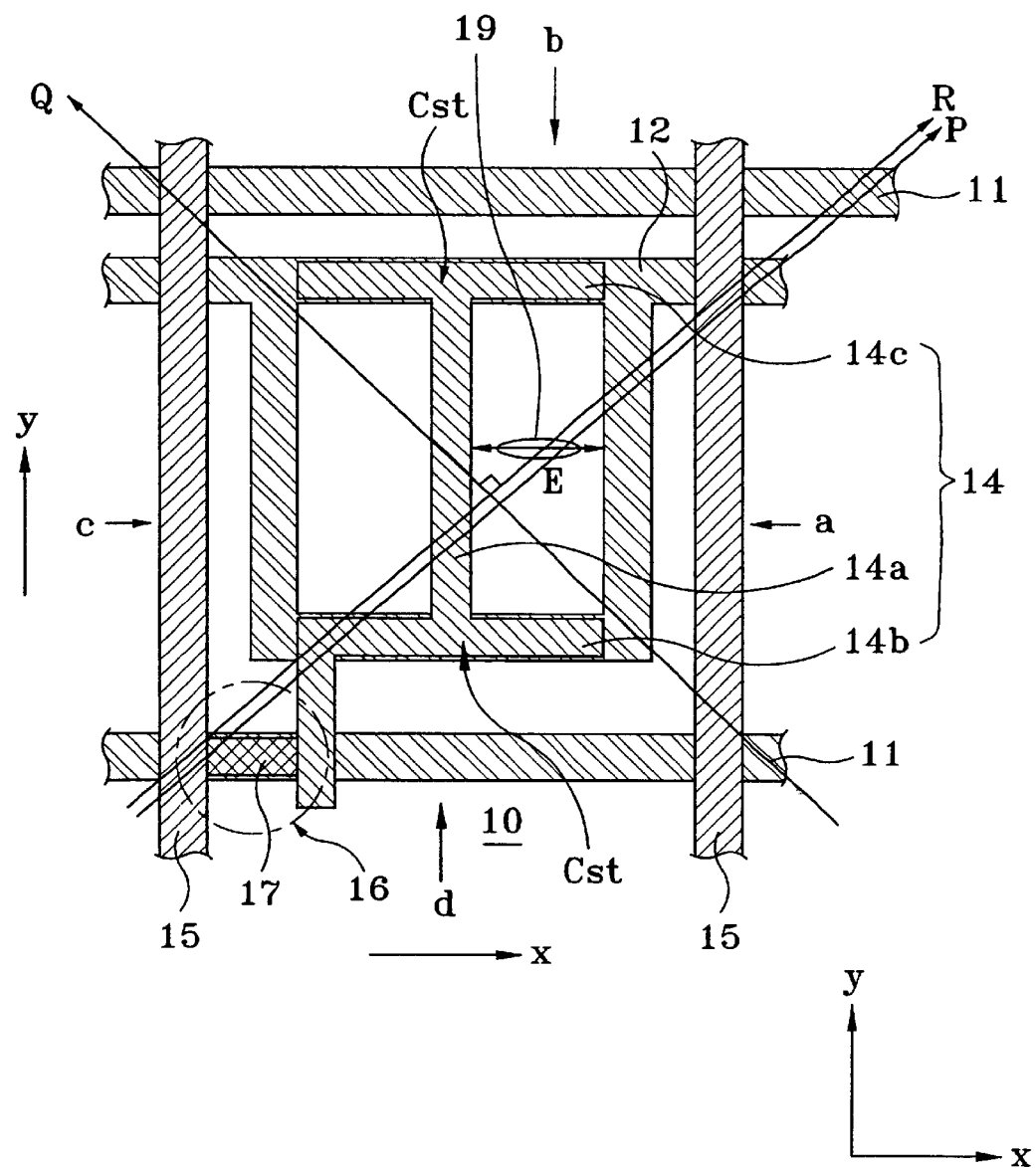
FIG. 1 is a cross-sectional view showing a conventional IPS-LCD.
Figure 2:
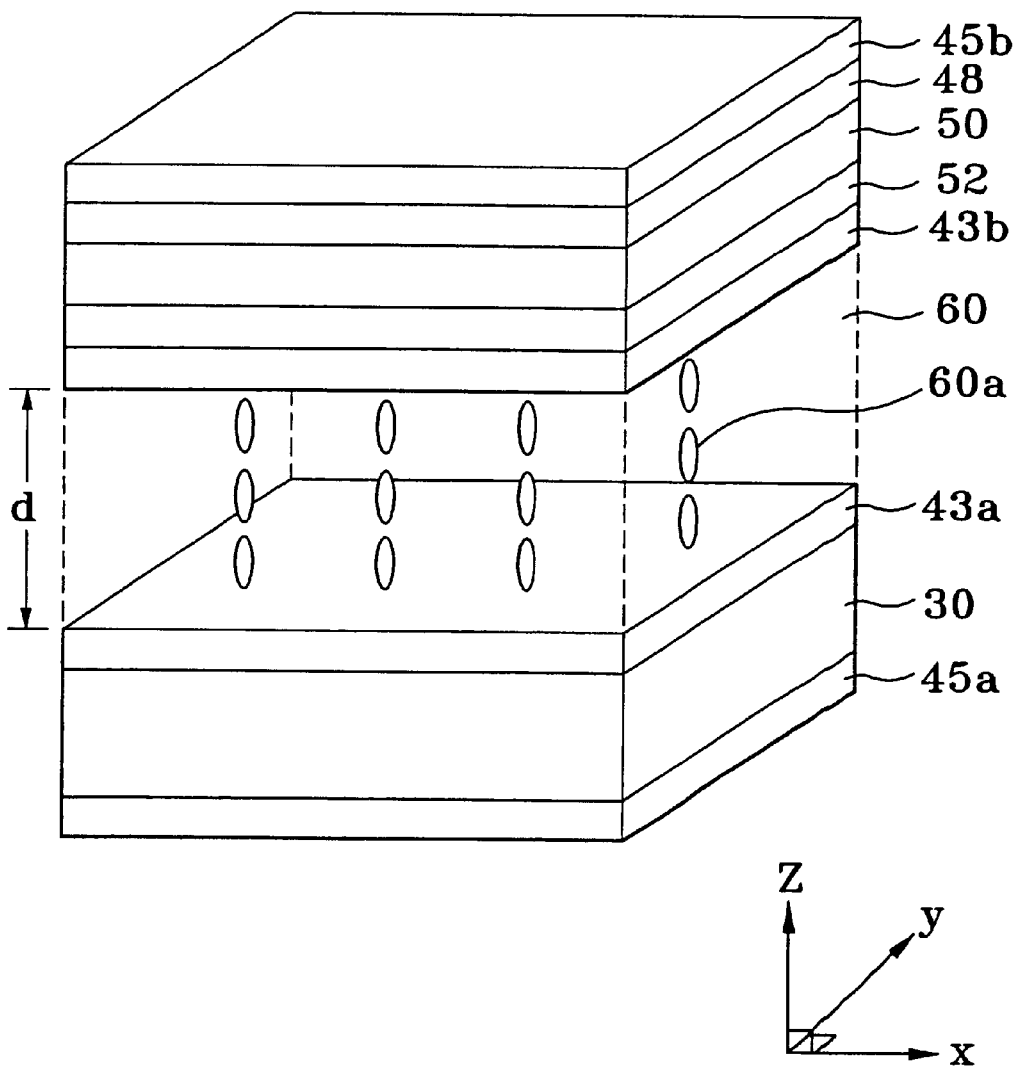
FIG. 2 is a perspective view showing a vertical alignment mode liquid crystal display according to the present invention.

First of all, referring to FIG. 2, a lower substrate 30 and an upper substrate 50 are opposed with intervening a selected distance(hereinafter "d"). The lower electrode 30 and the upper electrode 50 are made of a transparent insulating substrate, a cell gap d is selected below 6 $\mu$m, more preferably 4~4.5 $\mu$m. A liquid crystal layer 60 including a plurality of liquid crystal molecules 60a is sandwiched between the lower substrate 30 and the upper substrate 50. Herein, the liquid crystal molecules 60a in the liquid crystal layer 60 have dielectric anisotropy $\Delta \in$ and refractive anisotropy $\Delta n$. In the liquid crystal display of the present invention, liquid crystal molecules having positive dielectric anisotropy $\Delta \in$ or having negative dielectric anisotropy $\Delta \in$ are used selectively. At this time, the birefringence index $\Delta n$ of the liquid crystal molecules is selected in the consideration of the cell gap d, more preferably a product of the birefringence index $\Delta n$ and the cell gap d is in the range of 0.2~0.6 $\mu$m.

A color filter 52 is interposed between the upper substrate 50 and the liquid crystal layer 60. A first alignment layer 43a is interposed between the lower substrate 30, and a second alignment layer 43b is interposed between the upper substrate 50 and the liquid crystal layer 60. The first and the second alignment layers 43a,43b are homeotropic alignment layers having a pretilt angle of 85°~95°, more preferably 90°. Herein, no further rubbing process is required since the first and the second alignment layers 43a,43b are homeotropic alignment layers.

A first polarizing 45a is disposed at an outer face of the lower substrate 30, and a second polarizing plate 45b is disposed at an outer face of the upper substrate 50. A polarizing axis of the first polarizing plate 45a is parallel with the x-axis or the y-axis, and a polarizing axis of the second polarizing plate 45b is perpendicular to the polarizing plate of the first polarizing plate 45a.

A phase compensation plate 48 is interposed between the second polarizing plate 45b and the upper substrate 50. The phase compensation plate 48 comprises a plurality of liquid crystal molecules having negative birefringence, and the phase compensation plate 48 compensates the birefringence of the liquid crystal molecules 60a in the liquid crystal layer 60. At this time, a phase retardation of the phase compensation plate 48 is preferably equal to that of the liquid crystal layer 60. The phase retardation means a product of the thickness of phase compensation plate and the birefringence index of liquid crystal molecules included in the phase compensation plate 48.

Figure 3:
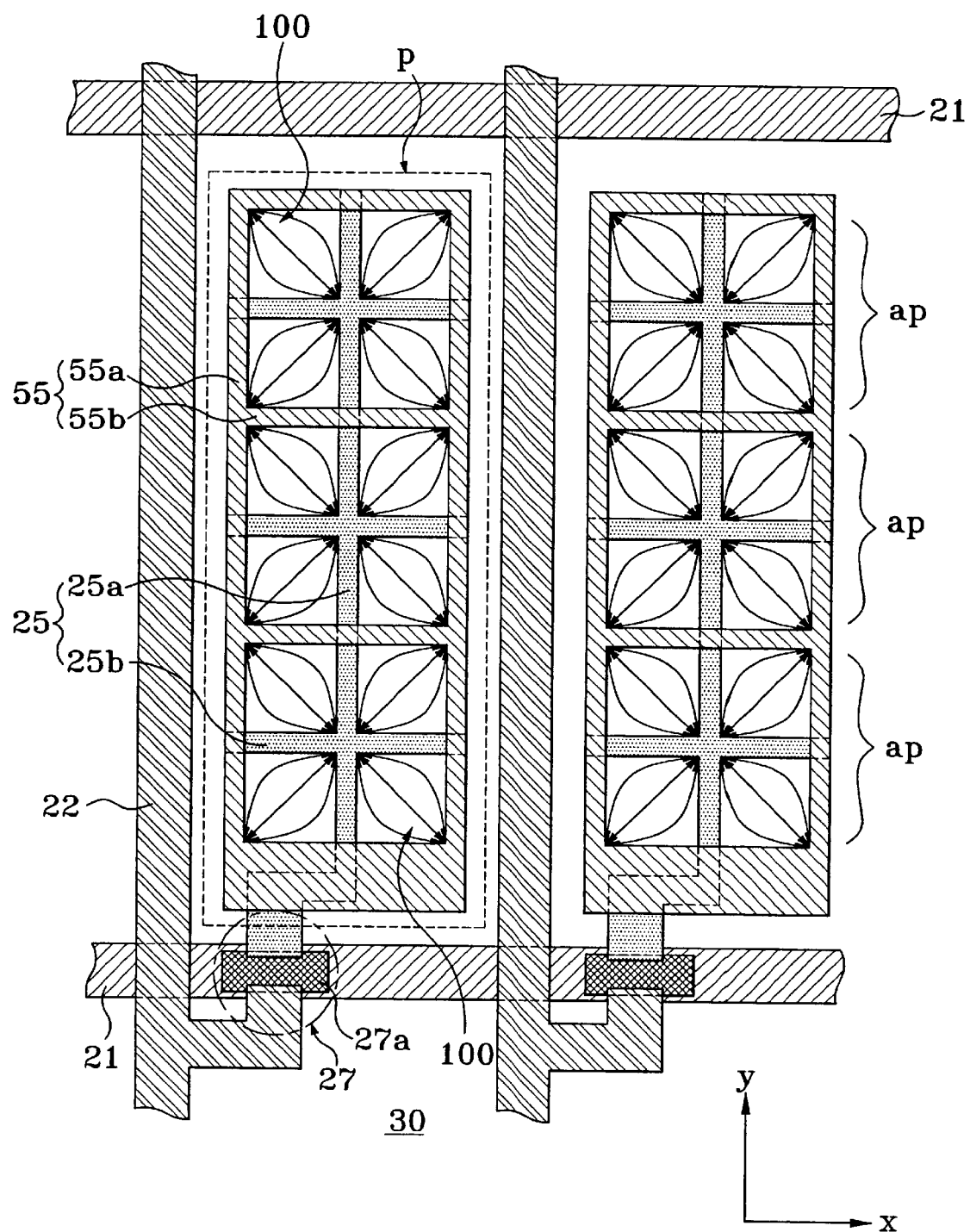
FIG. 3 is a plane view showing a liquid crystal display according to the present invention.

Referring to FIG. 3, a plurality of gate bus lines 21 and data bus lines 22 are disposed on the lower substrate 30 in a matrix shape, thereby defining sub pixels. The gate bus line 21 is extended along the x-axis and the data bus line 22 is extended along the y-axis. In the drawing, a pair of gate bus lines 21 and a pair of data bus lines 22 are shown. Herein, a gate insulating layer(not shown) is interposed between the gate bus line 21 and the data bus line 22, thereby electrically insulating therebetween. A thin film transistor having a channel layer 27a is disposed adjacent to an intersection of the gate bus line 21 and the data bus line 22.

A pixel electrode 25 is formed in the sub pixel p. The pixel electrode 25 includes a first branch 25a dividing inside of the sub pixel p into two portions in a direction parallel to the data bus line 22, and at least one or more, for example three second branches 25b which are extended parallel to the gate bus line 21 so that they can intersect the first branches 25a. A selected portion of the first branch 25a of the pixel electrode 25 is contacted with the thin film transistor 27, thereby transmitting a signal of the data bus line 22 to the pixel electrode 25 when the gate bus line 21 is selected.

A counter electrode 55 is formed between the color filter 52 of the upper substrate 50 and the second alignment layer 43b. At this time, the counter electrode 55 drives together with the pixel electrode 25 the liquid crystal molecules, and is disposed at each sub pixel p of the lower substrate 30 to correspond with each other. The counter electrode 55 includes a first electrode 55a having a rectangular frame shape in miniature of similar shape of the sub pixel p, and at least a second electrode 55b dividing a selected number of square spaces surrounded by the first electrode 55a. Herein, the second electrode 55b is disposed parallel with the gate bus line 21 so that the second electrode 55b divides the space surrounded by the first electrode 55a into a plurality of square spaces. Herein, the square spaces defined by the first and the second electrodes 55a,55b are referred as aperture regions "ap". In the present embodiment, two second electrodes 55b are provided at one counter electrode 55 thereby forming three aperture regions "ap" within one counter electrode 55. Consequently, there are formed three aperture regions "ap" within one counter electrode 55. Further, the counter electrode 55 formed at the upper substrate 50 is connected with all the counter electrodes 55 with in the adjoining sub pixels p, thereby receiving the same signal at all the counter electrodes 55 formed at the upper substrate 50.

Herein, the first branch 25a of the pixel electrode 25 divides the respective aperture regions "ap" in two along the direction of the data bus line 22. Further, the second branch 25b of each pixel electrode 25 divides each aperture region "ap" in two along the direction of the gate bus line 21. Moreover, the first and the second branches 25a,25b are arranged such that their intersection is positioned at the center of each aperture region "ap". By doing so, the aperture region "ap" including the first and the second electrodes 55a,55b is defined as four square electric field generating regions 100 by the first branch 25a and the second branch 25b. Accordingly, the space surrounded by the counter electrode 55 is divided by the first branch 25a and the second branch 25b into twelve electric field generating regions 100.

Operation of the liquid crystal display having aforementioned constitution is as follows.

First of all, when the gate bus line 21 is not selected, there is formed no electric field between the counter electrode 55 and the pixel electrode 25. Then, the liquid crystal molecules 60a within the liquid crystal layer 60 are aligned perpendicular to surfaces of the upper and the lower substrates 30,50 by the influence of the first and the second alignment layers 43a,43b. Therefore, light passed through the liquid crystal layer 60 is absorbed by the second polarizing plate 45 having the polarizing axis perpendicular to that of the first polarizing plate 45a, thereby showing a screen in dark state.

On the other hand, when the gate bus line 21 is selected and a display signal is transmitted to the data bus line 22, the thin film transistor 27 disposed adjacent to the intersection of the gate bus line 21 and the data bus line 22 is turned on.

And then, the display signal of the data bus line 22 is transmitted to the pixel electrode 25, thereby forming the electric field E between the counter electrode 55 of the upper substrate 50 and the pixel electrode 25. Herein, a common signal is applied to the counter electrode 55.

Figure 4:
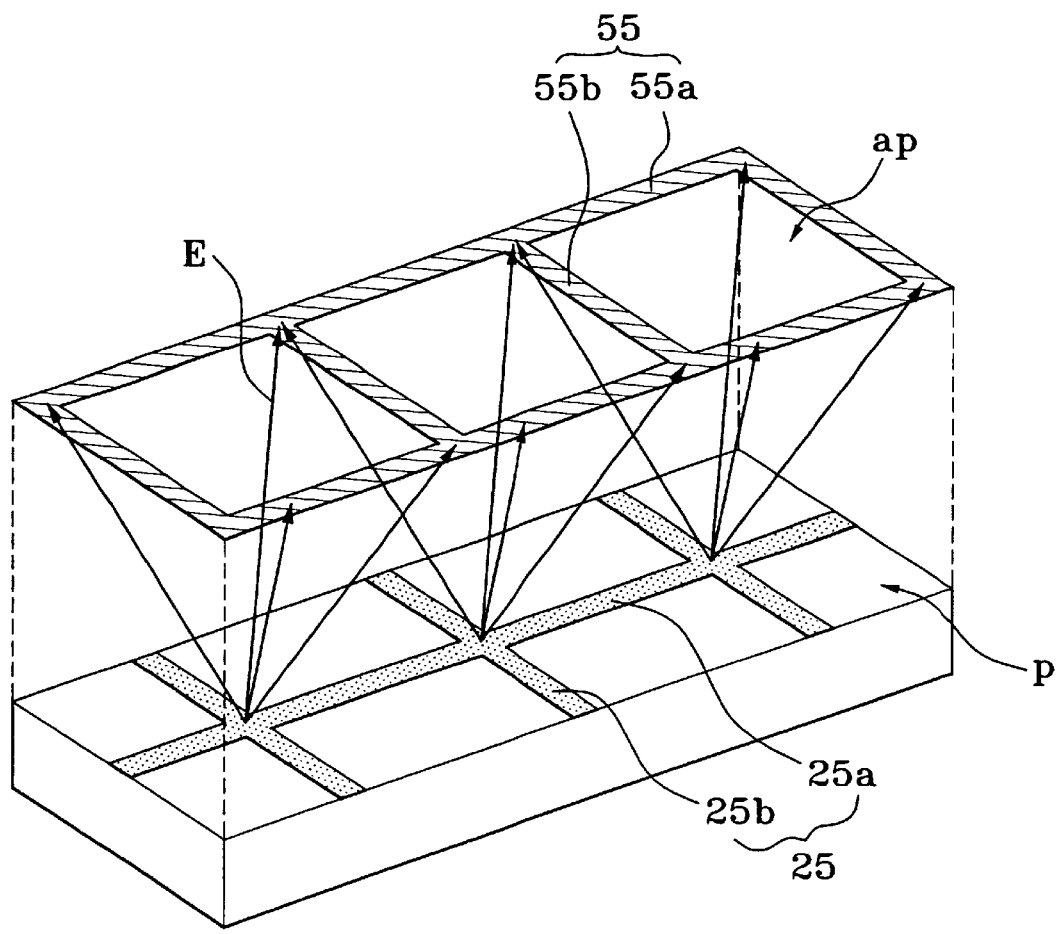
FIG. 4 is an outline perspective view showing counter and pixel electrodes for illustrating the operation of the liquid crystal display according to the present invention.

At this time, the electric field E as shown in FIG. 4 is formed in the form of an effective field between the nearest distance. Namely, the electric field E is formed as an oblique line between the intersection of the first and the second branches 25a,25b of the pixel electrode 25, and the intersection of the first and the second electrodes 55a,55b of the counter electrode 55.

Herein, since the electric field generating region 100 is a square, the electric field E projected to the lower substrate has an oblique line that makes approximately ±45° with the y-axis direction (or the x-axis direction). Therefore, the maximum transmittance of the liquid crystal display is obtained.

Namely, according to the above equation 1, the maximum transmittance is obtained when $\chi$ is $\pi/4(45°)$ and $\Delta nd/\lambda$ is ½. In this embodiment, the pixel electrode 25 and the counter electrode 55 are designed such that the $\Delta nd/\lambda$ is ½ by adjusting the type of liquid crystal molecules and the cell gap, and $\chi$ is designed by making ±45° between the y-axis (the direction of the polarizing axis) and the direction of the electric field. Therefore, the maximum transmittance is obtained.

When the liquid crystal molecules 60a are aligned according to the above-described electric field E, light incident from a back light is linearly polarized while passing the polarizing axis of the first polarizing plate 45a. And then, the polarizing state of the light is changed since an optical axes of the liquid crystal molecules make a selected degree of angle with the linearly polarized light while passing the liquid crystal layer 60. Accordingly, the phase changed light passes through the polarizing axis of the second polarizing plate 45b, thereby showing a white state in the screen. Herein, the polarizing axes of the first and the second polarizing plates 45a,45b and the long axes of the liquid crystal molecules 60a make ±45° respectively, thereby obtaining the maximum transmittance.

Furthermore, since there is formed an electric field of oblique lines toward four directions making symmetries each other within one aperture region "ap", the liquid crystal molecules are divided and arranged into four groups in one aperture region "ap". Accordingly, a four-domain of liquid crystal molecules is formed at the sub pixel p.

Therefore, in the white state, long and short axes of the liquid crystal molecules are all seen simultaneously even though a viewer watches the screen at any of azimuth angles. Then, the birefringence of the liquid crystal molecules is compensated thereby preventing the color shift.

As discussed in detail, according to the present invention, an electric field of oblique lines toward four directions making symmetries each other is formed within one sub pixel. Consequently, a complete multi-domain is formed and color shift thereof is improved.

Further, a response time characteristic is remarkably improved since the counter electrode is formed at the upper substrate, thereby realizing a fast moving picture on the screen. Moreover, a remaining static electricity and residue components are removed since the counter electrode is formed at the upper substrate.

While the present invention has been described with reference to certain preferred embodiment, various other modifications will be apparent to and can be readily made by those skilled in the art without departing from the scope and spirit of the present invention.

What is claimed is:

1. A liquid crystal display comprising:
   a lower substrate having a plurality of gate bus lines disposed parallel to each other, a plurality of data bus lines disposed perpendicular to the gate bus lines and defining matrix type sub pixels together with the gate bus lines, a thin film transistor provided adjacent to an intersection of the gate bus line and the data bus line, and a pixel electrode connected to the thin film transistor and disposed within the sub pixel;
   an upper substrate opposed to the lower substrate with a selected distance and having a counter electrode, the counter electrode formed at a portion corresponding to the sub pixel and forming an electric field together with the pixel electrode;
   a liquid crystal layer sandwiched between and having a plurality of liquid crystal molecules;
   a first alignment layer and a second alignment layer formed at inner face of the lower substrate and at inner face of the upper substrate respectively; and
   a first polarizing plate and a second polarizing plate attached at outer face of the lower substrate and at outer face of the upper substrate respectively,
   wherein the electric field formed between the counter electrode and the pixel electrode is formed as an oblique line with respect to the lower substrate surface, and is formed as a diagonal line having a symmetry with respect to the data bus line and the gate bus line.

2. The liquid crystal display of claim 1, wherein the counter electrode comprises a first electrode of a rectangular frame shape, and at least a second electrode disposed parallel with the gate bus line dividing a space surrounded by the first electrode into a plurality of square aperture regions;
   wherein the pixel electrode comprises a first branch parallel with the data bus lines and at least one or more second branches perpendicular to the first branch, and
   wherein an intersection of the first and the second branches is disposed at the right center of a space surrounded by the first and the second electrodes.

3. The liquid crystal display of claim 2, wherein the number of second electrodes of the counter electrode is two, and the number of the second branches of the pixel electrode is three.

4. The liquid crystal display of claim 1, wherein the polarizing axis of the first polarizing plate is disposed parallel with the gate bus line or the data bus line, and the polarizing axis of the second polarizing plate is disposed perpendicular to the polarizing axis of the first polarizing plate.

5. The liquid crystal display of claim 1, further comprising a phase compensation plate having negative birefringence index between the second polarizing plate and the upper substrate.

6. The liquid crystal display of claim 5, wherein a product of thickness of the phase compensation plate and the birefringence index is equal to a product of thickness of the liquid crystal layer and the birefringence index.

7. The liquid crystal display of claim 6, wherein the product of thickness of the liquid crystal layer and the birefringence index is in range of 0.2~0.6 $\mu$m.

8. The liquid crystal display of claim 1, wherein the first and the second alignment layers are homeotropic layers.

9. A liquid crystal display comprising:
a lower substrate having a plurality of gate bus lines disposed parallel to each other, a plurality of data bus lines disposed perpendicular to the gate bus lines and defining matrix type sub pixels together with the gate bus lines, a thin film transistor provided adjacent to an intersection of the gate bus line and the data bus line, and a pixel electrode connected to the thin film transistor and disposed within the sub pixel;
an upper substrate opposed to the lower substrate with a selected distance and having a counter electrode, the counter electrode formed at a portion corresponding to the sub pixel and forming an electric field together with the pixel electrode;
a liquid crystal layer sandwiched between and having a plurality of liquid crystal molecules;
a first alignment layer and a second alignment layer formed at inner face of the lower substrate and at inner face of the upper substrate respectively; and
a first polarizing plate and a second polarizing plate attached at outer face of the lower substrate and at outer face of the upper substrate respectively,
wherein the counter electrode comprises a first electrode of a rectangular frame shape, and at least a second electrode disposed parallel with the gate bus line dividing a space surrounded by the first electrode into a plurality of square aperture regions;
wherein the pixel electrode comprises a first branch parallel with the data bus lines and at least one or more second branches perpendicular to the first branch, and
wherein an intersection of the first and the second branches is disposed at the right center of a space surrounded by the first and the second electrodes.

10. The liquid crystal display of claim 9, wherein the number of second electrodes of the counter electrode is two, and the number of the second branches of the pixel electrode is three.

11. The liquid crystal display of claim 9, wherein the polarizing axis of the first polarizing plate is disposed parallel with the gate bus line or the data bus line, and the polarizing axis of the second polarizing plate is disposed perpendicular to the polarizing axis of the first polarizing plate.

12. The liquid crystal display of claim 10, further comprising a phase compensation plate having negative birefringence index between the second polarizing plate and the upper substrate.

13. The liquid crystal display of claim 12, wherein a product of thickness of the phase compensation plate and the birefringence index is equal to a product of thickness of the liquid crystal layer and the birefringence index.

14. The liquid crystal display of claim 13, wherein the product of thickness of the liquid crystal layer and the birefringence index is in range of 0.2 ~0.6 μm.

15. The liquid crystal display of claim 10, wherein the first and the second alignment layers are homeotropic alignment layers.

16. A liquid crystal display comprising:
a lower substrate having a plurality of gate bus lines disposed parallel to each other, a plurality of data bus lines disposed perpendicular to the gate bus lines and defining matrix type sub pixels together with the gate bus lines, a thin film transistor provided adjacent to an intersection of the gate bus line and the data bus line, and a pixel electrode connected to the thin film transistor and disposed within the sub pixel;
an upper substrate opposed to the lower substrate with a selected distance and having a counter electrode, the counter electrode formed at a portion corresponding to the sub pixel and forming an electric field together with the pixel electrode;
a liquid crystal layer sandwiched between and having a plurality of liquid crystal molecules;
a first homeotropic alignment layer and a second homeotropic alignment layer formed at inner face of the lower substrate and at inner face of the upper substrate respectively;
a first polarizing plate and a second polarizing plate attached at outer face of the lower substrate and at outer face of the upper substrate respectively; and
a phase compensation plate sandwiched between the second polarizing plate and the upper substrate, and having negative birefringence index,
wherein the counter electrode comprises a first electrode of a rectangular frame shape, and at least a second electrode disposed parallel with the gate bus line dividing a space surrounded by the first electrode into a plurality of square aperture regions;
wherein the pixel electrode comprises a first branch parallel with the data bus lines and at least one or more second branches perpendicular to the first branch, and
wherein an intersection of the first and the second branches is disposed at the right center of a space surrounded by the first and the second electrodes.

17. The liquid crystal display of claim 16, wherein the number of second electrodes of the counter electrode is two, and the number of the second branches of the pixel electrode is three.

18. The liquid crystal display of claim 17, wherein the polarizing axis of the first polarizing plate is disposed parallel with the gate bus line or the data bus line, and the polarizing axis of the second polarizing plate is disposed perpendicular to the polarizing axis of the first polarizing plate.

19. The liquid crystal display of claim 17, wherein a product of thickness of the phase compensation plate and the birefringence index is equal to a product of thickness of the liquid crystal layer and the birefringence index.

20. The liquid crystal display of claim 19, wherein the product of thickness of the liquid crystal layer and the birefringence index is in range of 0.2 ~0.6 μm.

* * * * *